US 9,255,550 B2
Feb. 9, 2016

(12) United States Patent
Loveland et al.

(54) EMISSION SYSTEM AND METHOD OF SELECTIVELY DIRECTING EXHAUST GAS AND AIR WITHIN AN INTERNAL COMBUSTION ENGINE

(71) Applicant: GM GLOBAL TECHNOLOGY OPERATIONS LLC, Detroit, MI (US)

(72) Inventors: Dustin P Loveland, Holly, MI (US); Jason G. Kohler, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 329 days.

(21) Appl. No.: 13/789,888

(22) Filed: Mar. 8, 2013

(65) Prior Publication Data
US 2014/0251286 A1    Sep. 11, 2014

(51) Int. Cl.
*F02M 25/07* (2006.01)
*F02M 35/10* (2006.01)
*F01N 13/10* (2010.01)

(52) U.S. Cl.
CPC ........... *F02M 25/07* (2013.01); *F02M 25/0739* (2013.01); *F01N 13/10* (2013.01); *F02M25/0727* (2013.01); *F02M 25/0755* (2013.01); *F02M 35/10393* (2013.01); *Y02T 10/121* (2013.01)

(58) Field of Classification Search
CPC .............. F02M 25/07; F02M 25/0739; F02M 25/0707; F02M 25/0738; F02M 25/0754; F02M 25/0704; F02M 25/0709; F02M 2025/0769; F02M 25/071; F02M 25/0719; F02M 25/0744; F02M 25/0748; F02M 31/083; F02M 35/10222; F02M 35/1038; F02M 35/10386; F02M 25/0712–25/0713; Y02T 10/47; Y02T 10/121; Y02T 10/42; Y02T 10/20; F01N 2560/025; F01N 11/007; F01N 13/011; F01N 2560/026; F01N 2610/03; F01N 3/0814; F01N 3/0885; F01N 3/2093; F01N 3/22; F01N 3/306; F01N 9/002; F02D 41/0065; F02D 23/02; F02D 41/0002; F02D 41/144; F02D 41/1454; F02D 2200/0806; F02D 2200/0808; F02D 35/0038; F02D 41/0047; F02D 41/0052; F02D 41/00; F02B 33/34; F02B 47/08; F23C 2202/30; F23C 9/00; F23L 5/02
USPC .............. 417/88, 143, 145, 147; 60/597, 600, 60/602, 604, 605.1, 605.2, 605.3, 606, 60/616, 272, 276, 278, 279, 280, 281, 282, 60/288, 293, 302, 304, 308, 312, 315, 689, 60/694, 695, 289; 73/114.06, 114.69, 73/114.71, 114.73, 114.74, 114.75, 73/114.77; 123/217, 51 BD, 58.7, 73 SC, 123/65 E, 65 VC, 65 VD, 65 M, 315, 323, 123/393, 406.45, 406.48, 672, 676, 698, 123/703, 559.2, 568.11, 568.12, 568.14, 123/568.15, 568.17, 150, 568.18, 568.19, 123/568.2, 568.23, 568.24, 568.25, 568.26, 123/568.27, 568.28, 568.29, 568.3, 568, 123/699
See application file for complete search history.

(56) References Cited

U.S. PATENT DOCUMENTS

| | | | | |
|---|---|---|---|---|
| 5,517,848 A | * | 5/1996 | Hosoya | F01N 3/22 73/114.75 |
| 5,519,992 A | * | 5/1996 | Hosoya | F01N 3/22 60/276 |
| 5,560,199 A | * | 10/1996 | Agustin | F01N 3/22 60/274 |
| 5,974,802 A | * | 11/1999 | Blake | F02M 25/0739 123/568.12 |
| 6,044,643 A | * | 4/2000 | Ittner | F01N 3/22 123/699 |
| 6,212,885 B1 | * | 4/2001 | Hirota | B01D 53/9454 60/274 |
| 6,295,817 B1 | * | 10/2001 | Abthoff | F01N 3/30 60/280 |
| 6,422,219 B1 | * | 7/2002 | Savonen | F02D 41/0002 123/568.12 |

| U.S. Patent Documents | | | | |
|---|---|---|---|---|
| 6,945,236 B2 * | 9/2005 | Nakai | F02B 31/085 | 123/568.12 |
| 7,357,125 B2 * | 4/2008 | Kolavennu | F02B 37/02 | 123/568.11 |
| 7,389,773 B2 * | 6/2008 | Stewart | F02D 31/007 | 123/672 |
| 7,395,658 B2 * | 7/2008 | Sunohara | F01N 3/0842 | 60/277 |
| 7,748,976 B2 * | 7/2010 | Burrahm | F23C 9/00 | 431/115 |
| 7,805,235 B2 * | 9/2010 | Sujan | F02B 47/08 | 123/434 |
| 8,037,676 B2 * | 10/2011 | Gabe | B01D 53/9495 | 60/274 |
| 8,297,054 B2 * | 10/2012 | Gladden | F02B 37/007 | 123/562 |
| 8,534,261 B2 * | 9/2013 | Hatamura | F01L 13/0026 | 123/299 |
| 2001/0012633 A1 * | 8/2001 | Ohsuga | B01D 53/8696 | 436/37 |
| 2003/0070423 A1 * | 4/2003 | Morinaga | F01N 3/2006 | 60/284 |
| 2004/0149272 A1 * | 8/2004 | Kurtz | F02B 1/12 | 123/568.21 |
| 2004/0194450 A1 * | 10/2004 | Tanaka | F01N 3/0231 | 60/285 |
| 2005/0000497 A1 * | 1/2005 | Nakai | F02B 31/085 | 123/568.12 |
| 2005/0011485 A1 * | 1/2005 | Ryan, III | F02D 21/08 | 123/295 |
| 2005/0263139 A1 | 12/2005 | Ryan, III et al. | | |
| 2006/0053770 A1 * | 3/2006 | Hammond | F01N 3/32 | 60/278 |
| 2006/0064968 A1 * | 3/2006 | Sunohara | F01N 3/0842 | 60/285 |
| 2006/0086080 A1 * | 4/2006 | Katogi | F01N 3/035 | 60/278 |
| 2006/0102158 A1 * | 5/2006 | Cairns | F02D 41/006 | 123/568.14 |
| 2006/0225410 A1 * | 10/2006 | Uchida | F01N 3/0842 | 60/299 |
| 2008/0163608 A1 * | 7/2008 | Yacoub | F01N 3/0814 | 60/276 |
| 2009/0007545 A1 * | 1/2009 | Kameda | B01D 3/9431 | 60/286 |
| 2009/0120073 A1 * | 5/2009 | Fujita | F01N 3/0814 | 60/295 |
| 2009/0126347 A1 * | 5/2009 | Gabe | B01D 3/9495 | 60/285 |
| 2009/0266060 A1 * | 10/2009 | Guo | F02D 41/029 | 60/295 |
| 2009/0288398 A1 * | 11/2009 | Perfetto | F02D 41/029 | 60/287 |
| 2009/0293453 A1 * | 12/2009 | Sujan | F01N 3/035 | 60/285 |
| 2010/0071364 A1 * | 3/2010 | Mahakul | F02B 37/001 | 60/602 |
| 2010/0107631 A1 * | 5/2010 | Pearson | F02M 25/0701 | 60/605.2 |
| 2010/0126146 A1 * | 5/2010 | Yamamoto | F01N 3/0253 | 60/286 |
| 2010/0126149 A1 * | 5/2010 | Kondou | F01N 3/22 | 60/287 |
| 2010/0305830 A1 * | 12/2010 | Santoso | F01N 3/22 | 701/103 |
| 2011/0072788 A1 * | 3/2011 | Ruona | F01N 3/023 | 60/276 |
| 2011/0138774 A1 * | 6/2011 | Pursifull | F01N 3/055 | 60/273 |
| 2011/0271936 A1 * | 11/2011 | Reyenga | F01N 5/02 | 123/542 |
| 2013/0042841 A1 * | 2/2013 | Vassallo | F02M 25/0728 | 123/568.12 |
| 2013/0312391 A1 * | 11/2013 | Cavataio | F02D 41/1475 | 60/274 |
| 2013/0312407 A1 * | 11/2013 | Surnilla | F01N 3/22 | 60/605.1 |

* cited by examiner

*Primary Examiner* — Lindsay Low
*Assistant Examiner* — John Bailey
(74) *Attorney, Agent, or Firm* — Quinn Law Group, PLLC

(57) ABSTRACT

A powertrain includes a combustion chamber, an intake assembly, an exhaust manifold, and a pump. The combustion chamber is configured for combusting an air and fuel mixture. The intake assembly is configured to supply air to the combustion chamber. The exhaust manifold is configured to draw exhaust gas from the combustion chamber. The pump is operatively disposed between the intake assembly and the exhaust manifold such that the pump is in fluid communication with each of intake assembly and the exhaust manifold. The pump is configured to operate in a first mode to draw exhaust gas from the exhaust manifold and supply the exhaust gas to the intake manifold at a positive EGR flow rate such that exhaust gas is supplied to the combustion chamber.

14 Claims, 2 Drawing Sheets

US 9,255,550 B2

EMISSION SYSTEM AND METHOD OF SELECTIVELY DIRECTING EXHAUST GAS AND AIR WITHIN AN INTERNAL COMBUSTION ENGINE

TECHNICAL FIELD

The present disclosure relates to an emission system and method of selectively directing exhaust gas within an internal combustion engine.

BACKGROUND

Internal combustion engines may re-circulate exhaust gas from the exhaust system to an intake manifold, typically referred to as Exhaust Gas Recirculation (EGR), to improve fuel efficiency of the vehicle and/or reduce engine emissions. Because the exhaust gas from the EGR system is directed to the intake manifold, the necessary operation of the EGR system, e.g., the fuel/air mixture ratio, may need to vary from the various operating conditions, and the amount of exhaust gas delivered by the dedicated EGR cylinders may need to be regulated.

SUMMARY

A powertrain includes a combustion chamber, an intake assembly, an exhaust manifold, and a pump. The combustion chamber is configured for combusting an air and fuel mixture. The intake assembly is configured to supply air to the combustion chamber. The exhaust manifold is configured to draw exhaust gas from the combustion chamber. The pump is operatively disposed between the intake assembly and the exhaust manifold such that the pump is in fluid communication with each of intake assembly and the exhaust manifold. The pump is configured to operate in a first mode to draw exhaust gas from the exhaust manifold and supply the exhaust gas to the intake manifold at a positive EGR flow rate such that exhaust gas is supplied to the combustion chamber.

A method of controlling a pump of an emission system that is operatively connected to an intake assembly and an exhaust manifold of an internal combustion engine includes determining a NOx concentration of the exhaust gas in the exhaust manifold. A determination is made as to whether the determined NOx concentration is at least equal to a NOx concentration limit. A determination is made as to whether a positive EGR flow rate required to lower the determined NOx concentration to below the NOx concentration limit. The pump is commanded to operate in a first mode to achieve the positive EGR flow rate.

In another aspect, a method of controlling a pump of an emission system that is operatively connected to an intake assembly and an exhaust manifold of an internal combustion engine includes determining a pressure differential between the exhaust manifold and the intake assembly. A determination is made as to whether a required pressure differential between the exhaust manifold and the intake assembly to provide a desired fuel efficiency of the internal combustion engine. A determination is made as to whether the determined pressure differential is at least equal to a required pressure differential. The pump is commanded to operate in a first mode to achieve the positive EGR flow rate such that required pressure differential is achieved.

The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

Figure 1:
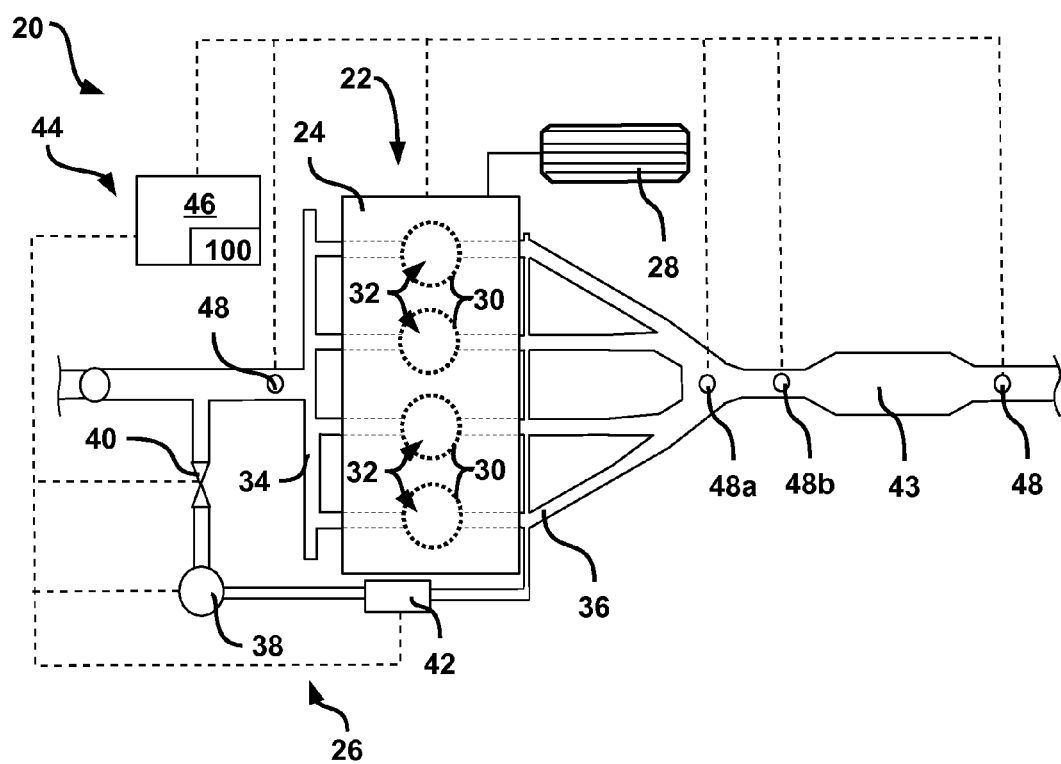
FIG. 1 is a schematic plan view of a vehicle including powertrain having an internal combustion engine and an emission system.

Referring to the Figures, wherein like numerals indicate like parts throughout the several views, a vehicle is generally shown at 20 in FIG. 1. The vehicle 20 has a powertrain 22 that includes an internal combustion engine 24 and an emission system 26. The internal combustion engine 24 is configured to power and propel at least one wheel 28 of the vehicle 20. The internal combustion engine 24 may include but is not limited to a diesel engine or a gasoline engine. The internal combustion engine 24 includes four cylinders 30, each defining a combustion chamber 32. However, it should be appreciated that the internal combustion engine 24 may include any suitable size and/or configuration of engine, including but not limited to an in-line six cylinder 30 engine, a v-style six cylinder 30 engine, or a v-style eight cylinder 30 engine. The internal combustion engine 24 further includes an intake assembly 34 and an exhaust manifold 36.

The combustion chamber 32 is configured for combusting an air/fuel mixture to provide drive torque to propel the wheels 28 of the vehicle 20. Air may enter the combustion chamber 32 of the internal combustion engine 24 by passing through an air filter (not shown) before entering the intake assembly 34. Therefore, the intake assembly 34 supplies air into the combustion chamber 32. Fuel is injected into the combustion chamber 32 to mix with the air, which provides an air/fuel mixture. Spark plugs (not shown) ignite the air/fuel mixture within the combustion chamber 32. Combustion of the air/fuel mixture creates exhaust gas. The exhaust gas exits the combustion chamber 32 and is drawn into the exhaust manifold 36.

With continued reference to FIG. 1, the emission system 26 includes a pump 38 that is operatively disposed between the intake assembly 34 and the exhaust manifold 36 such that the pump 38 is in fluid communication with each of intake assembly 34 and the exhaust manifold 36. The pump 38 is configured to operate in a first mode, a second mode, and not at all, to selectively control a direction of flow between the intake assembly 34 and the exhaust manifold 36. The pump 38 may be a turbine pump 38, such as a centrifugal pump 38, a kinetic pump 38, and the like. The pump 38 may also be a positive displacement pump 38. When the pump 38 is operating in the first mode, a positive pressure differential is generated or otherwise increased between the exhaust manifold 36 and the intake assembly 34, resulting in a positive EGR flow rate. This positive EGR flow rate draws exhaust gas from the exhaust manifold 36 and supplies the exhaust gas to the intake assembly 34 such that exhaust gas is supplied to the combustion chamber 32 to mix with the air-fuel mixture in larger quantities than if the pump 38 were not operating in the first mode. It should be appreciated that without the operation of the pump 38, a positive EGR flow rate may already exist and operation of the pump 38 in the first mode would serve to increase the positive EGR flow rate.

The increase in the exhaust gas that mixes with the air-fuel mixture inside of the combustion chamber 32 reduces the formation of locally rich, high temperature regions that contribute to soot formation. The positive EGR flow rate allows the exhaust gases to then act as diluents that suppress the temperature of combustion below that which significant amounts of mono-nitrogen oxides (NOx) are formed. The pump 38 may selectively operate at variable speeds in the first mode to vary the EGR flow rate, thus varying control of the temperature of combustion and formation of NOx. Therefore, a speed of the pump 38 may be increased in the first mode to increase the positive EGR flow rate. Likewise, the speed of the pump 38 may be decreased in the first mode, or otherwise turned off, to decrease the positive EGR flow rate.

Referring again to FIG. 1, the emission system 26 also includes an exhaust gas recirculation (EGR) valve 40. The EGR valve 40 is operatively disposed between the intake assembly 34 and the pump 38. As such, the EGR valve 40 is in fluid communication with the intake assembly 34 and the exhaust manifold 36. The EGR valve 40 is configured to move between an open position and a closed position to selectively control the flow of the exhaust gas between the exhaust manifold 36 to the intake assembly 34. When the EGR valve 40 is in the open position, air is permitted to flow therethrough. Likewise, when the EGR valve 40 is in the closed position, air is prevented from flowing therethrough. The position of the EGR valve 40 may be controlled by engine vacuum, by an engine control unit (ECU) 46, and the like. In some embodiments, the EGR valve 40 may be configured to provide metered openings that limit the amount of flow therethrough to selectively limit engine combustion temperatures and prevent NOx emissions. When the EGR valve 40 is in the open position, the EGR valve 40 may re-circulate a portion of the exhaust gas back into the intake assembly 34, as previously described.

The emission system 26 may also include a cooler 42 that is disposed in fluid communication with the exhaust manifold 36 and the EGR valve 40. More specifically, the cooler 42 may be operatively disposed between the exhaust manifold 36 and the pump 38. As such, the cooler 42 is configured to cool the exhaust gas received from the exhaust manifold 36, prior to mixing the exhaust gases with the ambient air in the intake assembly 34.

When the pump 38 is selectively operating in the second mode, a pressure differential is generated between the intake assembly 34 and the exhaust manifold 36, resulting in a fresh air intake flow. In the second mode, the negative pressure differential, created by operation of the pump 38, draws air from the intake assembly 34 and supplies the air to the exhaust manifold 36 via secondary air injection (SAI) to mix with the exhaust gas. More specifically, during cold starting of the vehicle 20, there is a scarcity of oxygen in the exhaust gas entering the exhaust manifold 36. The scarcity of oxygen in the exhaust gas may limit the extent of any exothermic chemical reaction in the exhaust manifold 36 and/or the catalyst within a catalytic converter 43. Therefore, the mixture of the air with the exhaust gas within the exhaust manifold 36 during cold starts increases the oxygen content within the exhaust gas, allowing additional combustion of the exhaust gas to increase the exhaust temperature into the catalytic converter 43. More specifically, this higher temperature increase may result in a faster catalyst light-off by a catalyst in the catalytic convertor 43, allowing for a reduction of the NOx, HC, and CO in the exhaust gas during cold starting.

As shown in FIG. 1, a control system 44 is in communication with, and capable of operating, the powertrain 22. The control system 44 is illustrated in highly schematic fashion. The control system 44 is mounted on-board the vehicle 20 and in communication with several components of the internal combustion engine 24 and the emission system 26. The control system 44 performs real-time, on-board detection, diagnostic, and calculation functions for the powertrain 22.

The control system 44 may include one or more components with a storage medium and a suitable amount of programmable memory, which are capable of storing and executing one or more algorithms or methods to effect control of the powertrain 22. Each component of the control system 44 may include distributed controller architecture, and may be part of the ECU 46. Additional modules or processors may be present within the control system 44.

Still referring to FIG. 1, the vehicle 20 may include a plurality of sensors 48 that are electrically connected to or otherwise in communication with each of the engine, the EGR valve 40, the pump 38, the cooler 42 and the like. More specifically, the sensors 48 may be configured to monitor a mass airflow into the intake assembly 34, a quantity of oxygen in the exhaust gas, a throttle position, a crankshaft position, and the like. By way of a non-limiting example, the sensors 48 may include a NOx sensor 48a configured to determine a concentration of NOx in the manifold, an exhaust gas temperature sensor 48b configured to sense a temperature of the exhaust gas, and the like. It should be appreciated that more or less sensors 48 may be in communication with the ECU 46. The communication may be a hard wired or wireless control link or path suitable for transmitting and receiving the necessary electrical control signals for proper control of the pump 38 and EGR valve 40. The ECU 46 includes a microprocessor unit that receives and processes various vehicle 20 operating values including an APM voltage output (V) and an APM current output (i). The ECU 46 can be configured as a distributed or a central control module having such control modules and capabilities as might be necessary to execute all required power flow control functionality aboard the vehicle 20 in the desired manner.

Additionally, the ECU 46 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Any algorithms resident in the ECU 46 or accessible thereby, can be stored in ROM and executed to provide the respective functionality.

The ECU 46 is configured to selectively move the EGR valve 40 between the open position and the closed position. The ECU 46 also configured to selectively operate the pump 38 in the first mode, the second mode, or not at all. Further, the ECU 46 may be configured to operate the pump 38 at any desired speed or mode to vary the EGR flow rates, as required. Thus, when the pump 38 is operating in the first mode, higher positive EGR flow rates may be attained in regions of vehicle 20 engine operation that would typically result in a limited pressure differential. As such, improved engine fuel efficiency can be attained. Further, since the pump 38 is also allowed to operate in the second mode to achieve the fresh air flow rate during vehicle 20 cold starts to provide SAI to the exhaust manifold 36, emission system 26 hardware is minimized.

Figure 2:
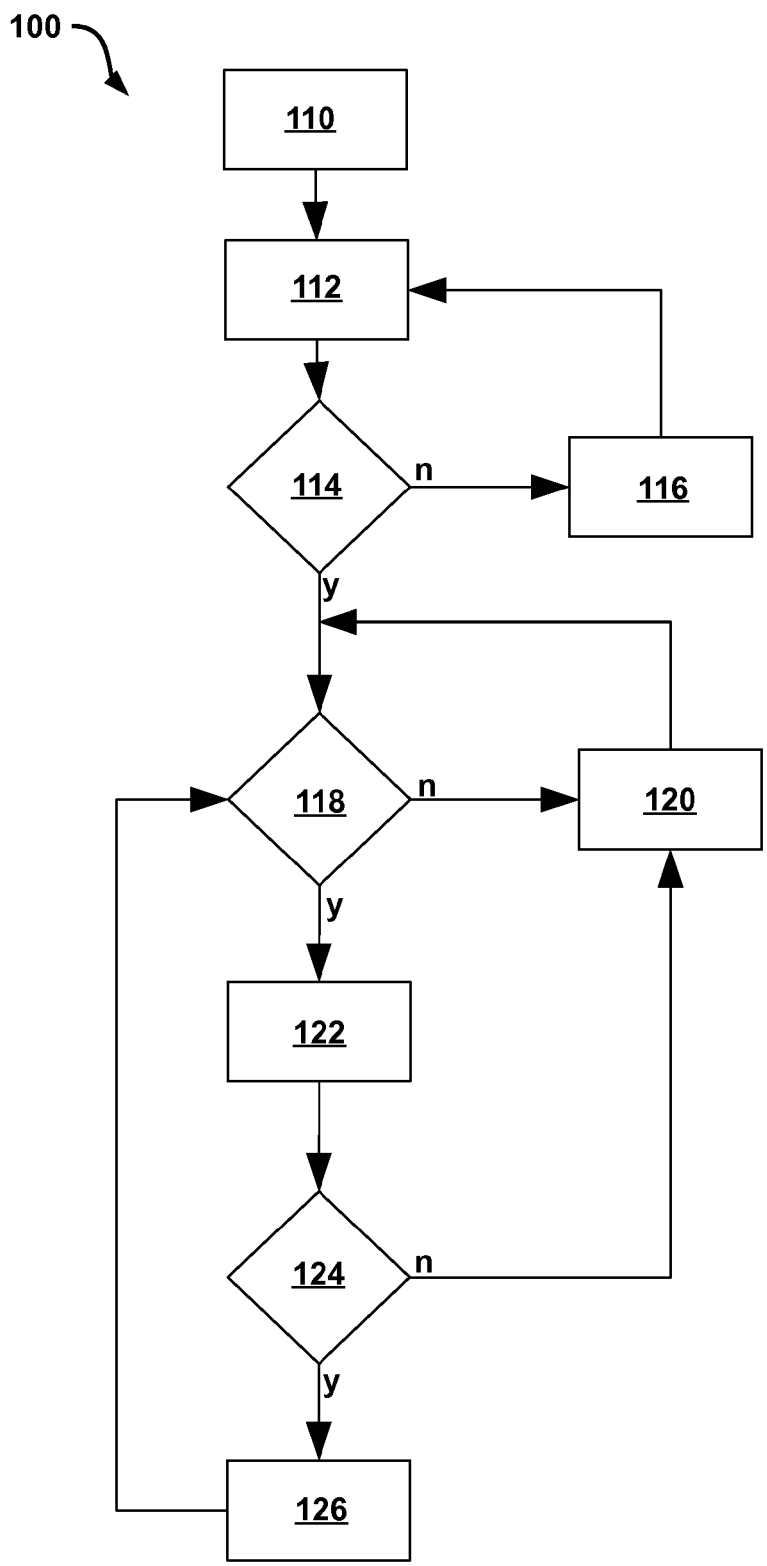
FIG. 2 is a schematic flow chart illustrating an algorithm or method for controlling the emission system, such as within the internal combustion engine of FIG. 1.

Referring now to FIG. 2, and with continued reference to FIG. 1, there is shown a method 100 for controlling the emission system 26, such as the emission system 26 shown in FIG. 1. The method 100 may be executed completely or partially within the control system 44.

FIG. 2 shows only a high-level diagram of the method 100. The exact order of the steps of the algorithm or method 100 shown may not be required. Steps may be reordered, steps may be omitted, and additional steps may be included. Furthermore, the method 100 may be a portion or sub-routine of another algorithm or method.

For illustrative purposes, the method 100 is described with reference to elements and components shown and described in relation to FIG. 1 and may be executed by the control system 44. However, other components may be used to practice the method 100 and the invention defined in the appended claims. Any of the steps may be executed by multiple controls or components of the control system 44.

Referring again to FIG. 2, the method 100 may begin at a start or initialization step 110, during which time the method 100 is made active and is monitoring operating conditions of the vehicle 20, the internal combustion engine 24 and the emission system 26. Initiation may occur, for example, in response to the vehicle 20 operator inserting the ignition key or in response to specific conditions being met. The method 100 may be running constantly or looping constantly whenever the vehicle 20 is in use.

A determination of the exhaust gas temperature is made at step 112. The determination may be made using one or more of the sensors 48, empirically, using look-up tables, and the like.

At step 114, the determined exhaust gas temperature may be compared with a required minimum exhaust gas temperature. If the determined exhaust gas temperature is not at least equal to the required minimum exhaust gas temperature, then the pump 38 may operate in the second mode at step 116, as described above.

If the determined exhaust gas temperature is determined to be at least equal to the required minimum exhaust gas temperature, then a determination of whether the EGR valve 40 is in the open position is made at step 118. If the EGR position is determined to not be in the open position, i.e., is in the closed position, then, at step 120 the pump 38 does not operate in any mode.

If the EGR position is determined to be in the open position, then at step 122, a determination of the NOx concentration of the exhaust gas is made. This determination may be made using one or more of the sensors 48, empirically, using look-up tables, and the like.

At step 124, a determination is made as to whether the NOx concentration needs to be reduced to below a NOx concentration limit. If the determination is made at step 124 that the NOx concentration does not require reduction, the method 100 then proceeds to step 120 so that the pump 38 does not operate in any mode.

If, however, at step 124, a determination is made that the NOx concentration does need to be reduced to below the NOx concentration limit, a positive EGR flow rate required to lower the determined NOx concentration to below the NOx concentration limit is determined. The method 100 then proceeds to step 126, which commands the pump 38 to operate in the first mode to reduce the NOx concentration of the exhaust gas to below the NOx concentration limit.

While the best modes for carrying out the disclosure have been described in detail, those familiar with the art to which this disclosure relates will recognize various alternative designs and embodiments for practicing the disclosure within the scope of the appended claims.

The invention claimed is:

1. A powertrain comprising:
   a combustion chamber configured for combusting an air and fuel mixture;
   an intake assembly configured to supply air to the combustion chamber;
   an exhaust manifold configured to draw exhaust gas from the combustion chamber; and
   a pump operatively disposed between the intake assembly and the exhaust manifold such that the pump is in fluid communication with each of the intake assembly and the exhaust manifold;
   wherein the pump is configured to operate in a first mode to draw exhaust gas from the exhaust manifold and supply the exhaust gas to the intake manifold at a positive EGR flow rate such that exhaust gas is supplied to the combustion chamber, and
   wherein the pump is also configured to operate in a second mode to draw fresh air from the intake assembly at a fresh air intake flow rate and supply the fresh air directly to the exhaust manifold such that the fresh air entering the exhaust manifold mixes with the exhaust gas entering the exhaust manifold to increase the oxygen content within the exhaust gas and to increase a combustion temperature of the exhaust gas exiting the exhaust manifold.

2. A powertrain, as set forth in claim 1, further comprising an exhaust gas recirculation valve in fluid communication with the intake assembly wherein the exhaust gas recirculation valve is configured to move between an open position and a closed position to selectively control the flow of the exhaust gas from the exhaust manifold to the intake assembly;
   wherein exhaust gas is prevented from flowing between the exhaust manifold and the intake assembly when the EGR valve is in the closed position; and
   wherein the exhaust gas is allowed to flow between the exhaust manifold and the intake assembly when the EGR valve is in the open position.

3. A powertrain, as set forth in claim 2, further comprising a NOx sensor configured to determine a concentration of NOx in the exhaust manifold;
   wherein the pump is configured to operate in the first mode if the determined concentration of NOx in the exhaust manifold is determined to require an increased positive EGR flow rate.

4. A powertrain, as set forth in claim 2, further comprising a cooler in fluid communication with the exhaust gas recirculation valve;
   wherein the cooler is configured to cool the exhaust gas received from the exhaust manifold.

5. A powertrain, as set forth in claim 1, wherein the pump is a turbine pump.

6. A powertrain, as set forth in claim 1, further comprising an exhaust gas temperature sensor configured to sense a temperature of the exhaust gas;
   wherein the pump is configured to operate in the second mode when the temperature of the exhaust gas is determined to be less than a required minimum exhaust gas temperature.

7. A powertrain, as set forth in claim 1, wherein a rotational speed of the pump in one of the first mode and the second mode is variable to control the corresponding positive EGR flow rate and fresh air intake flow rate.

8. A method of controlling a pump of an emission system operatively connected to an intake assembly and an exhaust manifold of an internal combustion engine, the method comprising:

determining a NOx concentration of exhaust gas in the exhaust manifold;

determining the NOx concentration of exhaust gas is at least equal to a NOx concentration limit;

determining a positive EGR flow rate required to lower the determined NOx concentration to below the NOx concentration limit; and commanding the pump to operate in a first mode to achieve the positive EGR flow rate until the NOx concentration is determined to be below the NOx concentration limit;

determining an exhaust gas temperature;

determining the exhaust gas temperature is less than a required minimum exhaust gas temperature;

determining a fresh air intake flow rate required to raise the exhaust gas temperature to be at least equal to the required minimum exhaust gas temperature; and commanding the pump to operate in a second mode to achieve the fresh air intake flow rate to draw fresh air from the intake assembly at the fresh air intake flow rate and supply the fresh air directly to the exhaust manifold such that the fresh air entering the exhaust manifold mixes with the exhaust gas entering the exhaust manifold to increase the oxygen content within the exhaust gas and to increase a combustion temperature of the exhaust gas exiting the exhaust manifold.

9. A method, as set forth in claim 8, wherein commanding the pump to operate in a first mode is further defined as commanding the pump to operate in a first mode to achieve the positive EGR flow rate until the NOx concentration is determined to be below the NOx concentration limit.

10. A method, as set forth in claim 8, wherein commanding the pump to operate in a second mode is further defined as commanding the pump to operate in a second mode to achieve the fresh air intake flow rate until the exhaust gas temperate is determined to be at least equal to the required minimum exhaust gas temperature.

11. A method, as set forth in claim 8, further comprising:

determining whether an exhaust gas recirculation valve is in an open position; and wherein commanding the pump to operate in a first mode is further defined as commanding the pump to operate in a first mode to achieve the positive EGR flow rate when the exhaust gas recirculation valve is in the open position.

12. A method of controlling a pump of an emission system operatively connected to an intake assembly and an exhaust manifold of an internal combustion engine, the method comprising:

determining a pressure differential between the exhaust manifold and the intake assembly;

determining a required pressure differential between the exhaust manifold and the intake assembly to provide a desired fuel efficiency of the internal combustion engine;

determining whether the determined pressure differential is at least equal to a required pressure differential;

commanding the pump to operate in a first mode to achieve the positive EGR flow rate such that required pressure differential is achieved;

determining an exhaust gas temperature;

determining the exhaust gas temperature is less than a required minimum exhaust gas temperature;

determining a fresh air intake flow rate required to raise the exhaust gas temperature to be at least equal to the required minimum exhaust gas temperature; and commanding the pump to operate in a second mode to achieve the fresh air intake flow rate to draw fresh air from the intake assembly at the fresh air intake flow rate and supply the fresh air directly to the exhaust manifold such that the fresh air entering the exhaust manifold mixes with the exhaust gas entering the exhaust manifold to increase the oxygen content within the exhaust gas and to increase a combustion temperature of the exhaust gas exiting the exhaust manifold.

13. A method, as set forth in claim 12, further comprising:

determining whether an exhaust gas recirculation valve is in an open position; and wherein commanding the pump to operate in a first mode is further defined as commanding the pump to operate in a first mode to achieve the positive EGR flow rate when the exhaust gas recirculation valve is in the open position.

14. A method, as set forth in claim 12, wherein commanding the pump to operate in a second mode is further defined as commanding the pump to operate in a second mode to achieve the fresh air intake flow rate until the exhaust gas temperate is determined to be at least equal to the required minimum exhaust gas temperature.

* * * * *